United States Patent
Kennel et al.

(10) Patent No.: US 6,219,743 B1
(45) Date of Patent: Apr. 17, 2001

(54) APPARATUS FOR DYNAMIC RESOURCE MAPPING FOR ISOLATING INTERRUPT SOURCES AND METHOD THEREFOR

(75) Inventors: John C. Kennel, Austin; Jeffrey Scott Mayes, Round Rock, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/164,128

(22) Filed: Sep. 30, 1998

(51) Int. Cl.[7] .................................................. G06F 13/24
(52) U.S. Cl. ........................... 710/260; 710/268; 710/269
(58) Field of Search ..................................... 710/260, 268, 710/269, 104, 8, 3, 48, 261, 266, 46, 47, 50, 111, 114, 115, 116, 121, 122, 123, 264, 265

(56) References Cited

U.S. PATENT DOCUMENTS

| | | | |
|---|---|---|---|
| 4,768,149 | * 8/1988 | Konopik et al. | 710/269 |
| 5,303,378 | * 4/1994 | Cohen | 710/260 |
| 5,506,997 | * 4/1996 | Maguire et al. | 710/260 |
| 5,566,334 | * 10/1996 | Loader | 210/269 |
| 5,727,227 | * 3/1998 | Schmidt et al. | 710/260 |
| 5,805,902 | * 9/1998 | Kikinis et al. | 710/261 |
| 5,822,595 | * 10/1998 | Hu | 710/269 |
| 5,878,237 | * 3/1999 | Olarig | 710/128 |
| 5,892,957 | * 4/1999 | Normoyle et al. | 710/263 |
| 5,968,159 | * 10/1999 | Mattheis | 710/260 |
| 5,999,989 | * 12/1999 | Patel | 710/1 |

* cited by examiner

Primary Examiner—Robert Beausoleil
Assistant Examiner—Xuong Chung-Trans
(74) Attorney, Agent, or Firm—Barry S. Newberger; Winstead Sechrest & Minick P.C.; Leslie A. Van Leeuwen

(57) ABSTRACT

An apparatus and method of dynamic resource mapping for isolating interrupt sources is implemented. Each interrupt source is provided with a unique identifier. The identifier is mapped to an interrupt number which is sent to an operating system when the interrupt source corresponding to the identifier generates an interrupt. Each device is associated with a data structure that includes a data value which is operable for accessing an interrupt register. The data value may be a pointer that points to a pointer to the interrupt register for the device generating the interrupt. When an interrupt is generated, the mapping may be used to access the pointers which thereby provide direct access to the interrupt register, whereby the contents of the interrupt register are processed by an interrupt service routine.

30 Claims, 4 Drawing Sheets

APPARATUS FOR DYNAMIC RESOURCE MAPPING FOR ISOLATING INTERRUPT SOURCES AND METHOD THEREFOR

TECHNICAL FIELD

The present invention relates in general to data processing systems, and in particular, to interrupt isolation and handling in data processing systems.

BACKGROUND INFORMATION

Modern data processing systems may have many attached remote peripheral units, numbering in the tens, or more. Each of these remote units may be the source of an interrupt that the operating system (OS) must isolate and handle. Moreover, it is the nature of most interrupts that they require immediate attention. For example, a peripheral device may monitor its environment, and generate an interrupt if an environmental problem, such as over temperature, fan loss or power loss occurs. These environmental problems may require immediate attention in order to preserve data integrity, and prevent the hardware from becoming permanently damaged.

Interrupt isolation mechanisms examine each of the attached peripheral units. The operating system traverses the attached peripheral units until a device having a set interrupt register is found Having thus isolated the source of the interrupt, the OS can service the interrupt. Having to examine each of the attached peripheral units, until the interrupt source is found can introduce a significant delay in overall data processing system speed. Thus, there is a need in the art for apparatus and methods to reduce the time needed to isolate interrupt sources, and thereby improve the handling of interrupts.

SUMMARY OF THE INVENTION

The aforementioned needs are addressed by the present invention. Accordingly, there is provided, in a first form, a method of dynamic resource mapping for isolating interrupt sources. The method includes providing a plurality of interrupt source device identifiers, wherein each identifier corresponds to one of a plurality of interrupt sources. A table mapping the interrupt source identifiers to corresponding interrupt numbers is generated, and an interrupt, represented by one of the interrupt numbers, is associated with a corresponding device generating the interrupt using the table.

There is also provided, in a second form, a data processing system having a central processing unit (CPU), wherein a plurality of peripheral devices are coupled to the CPU. The CPU includes circuitry operable for dynamic resource mapping for isolating interrupts from the plurality of peripheral devices, which circuitry includes circuitry operable for providing a plurality of interrupt source device identifiers. Each identifier corresponds to one of the plurality of peripheral devices. Also included is circuitry operable for generating a table mapping the interrupt source identifiers to corresponding interrupt numbers, and circuitry operable for associating an interrupt, represented by one of the interrupt numbers, with a corresponding device generating the interrupt using the table.

Additionally, there is provided, in a third form, a program product in a computer readable medium for dynamic resource mapping for isolating interrupt sources. The program product has programming for providing a plurality of interrupt source device identifiers, wherein each identifier corresponds to one of a plurality of interrupt sources. Also included is programming for generating a table mapping the interrupt source identifiers to corresponding interrupt numbers, and programming for associating an interrupt, represented by one of the interrupt numbers, with a corresponding device generating the interrupt using the table.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
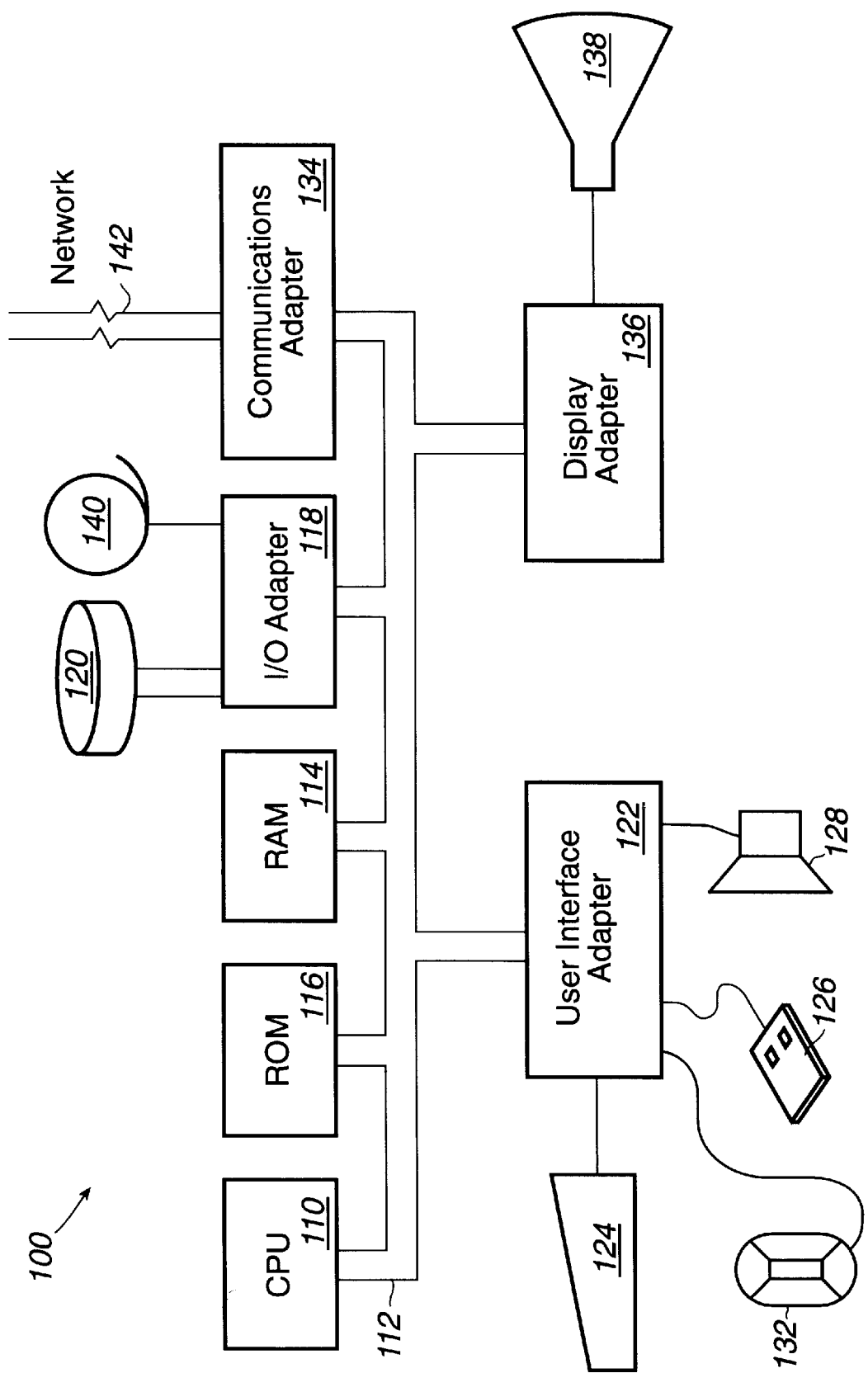
FIG. 1 illustrates, in block diagram form, a data processing system in accordance with an embodiment of the present invention.

The present invention provides a dynamic resource mapping mechanism for isolating interrupt sources. Each peripheral device that is capable of interrupting the operating system (OS) is assigned an interrupt number. The device is also provided with a unique device identifier (ID), which may be stored and later retrieved from the device. A mapping of the interrupt number to the device ID is created and provided to runtime firmware. Using this mapping, the OS can isolate and service the interrupt using the device ID in the map table to go directly to an interrupt service routine for the interrupting device In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail.

Refer now to the drawings wherein depicted elements are not necessarily shown to scale and wherein like or similar elements are designated by the same reference numeral through the several views.

Referring first to FIG. 1, an example is shown of a data processing system 100 which may be used for the invention. The system has a central processing unit (CPU) 110, which is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communicate with other such systems. Input/Output devices are also connected to system bus 112 via user interface adapter 122 and display adapter 136. Keyboard 124, track ball 132, mouse 126 and speaker 128 are all interconnected to bus 112 via user interface adapter 122. Display monitor 138 is connected to system bus 112 by display adapter 136. In this manner, a user is capable of inputting to the system throughout the keyboard 124, trackball 132 or mouse 126 and receiving output from the system via speaker 128 and display 138.

Preferred implementations of the invention include implementations as a computer system programmed to execute the method or methods described herein, and as a computer program product. According to the computer system implementation, sets of instructions for executing the method or methods are resident in the random access memory 114 of one or more computer systems configured generally as described above. Until required by the computer system, the set of instructions may be stored as a computer program product in ROM 116, or in another computer memory, for example, in disk drive 120 (which may include a removable memory such as an optical disk or floppy disk for eventual use in the disk drive 120). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like, the reader should remember that all of these and similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Figure 2:
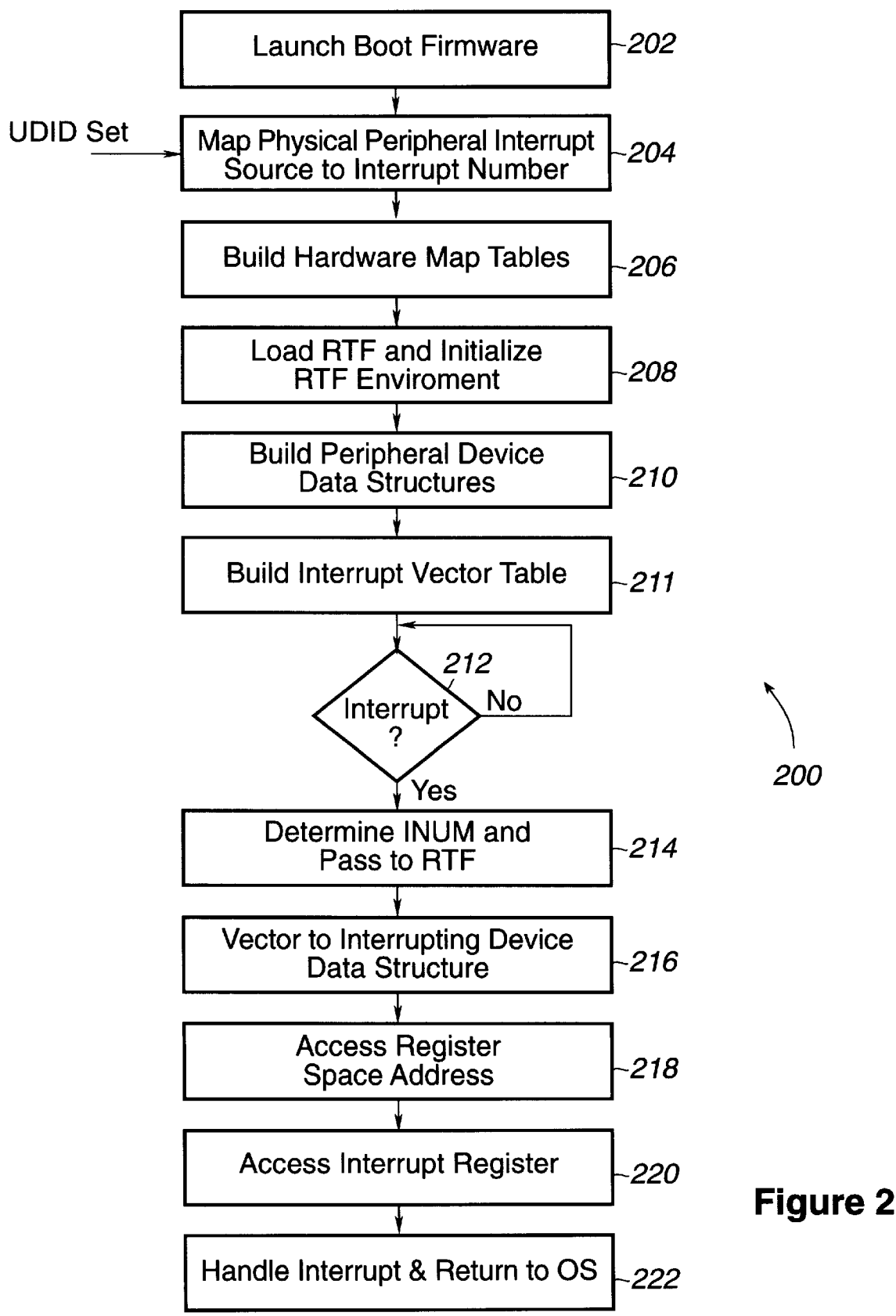
FIG. 2 illustrates, in flowchart form, a method of interrupt isolation in accordance with an embodiment of the present invention.

Refer now to FIG. 2 in which is illustrated a method 200 for isolating interrupt sources in accordance with an embodiment of the present invention. In step 202, data processing system launches boot firmware, which may be located in ROM 116 in FIG. 1. CPU 110 vectors to the boot firmware which loads itself and run time firmware (RTF) segments into RAM 114 and initiates system initialization.

In step 204, the boot firmware maps each physical peripheral interrupt source with a logical interrupt number. The interrupt number corresponds to a physical structure for communicating the interrupt to the CPU, usually a line in the bus connecting the peripheral to the system. However, the interrupt number is not otherwise associated with a physical interrupt source device until the mapping is constructed by the boot firmware. Each physical interrupt source is provided with a unique physical device identifier (UDID). Each device UDID uniquely identifies the associated device, and may be drawn from a predetermined set of UDIDs provided in the firmware. The UDID may be stored in the device and later retrieved therefrom. Alternative configurations of data processing system 200 may include first and second pluralities of such peripheral devices which differ from each other in number and type of device. The boot firmware probes the bus to locate these devices and assigns the UDID. For peripheral devices that are constant across embodiments, a UDID may be statically assigned. A table mapping interrupt numbers to device UDIDs is built by the boot firmware in response thereto.

Figure 3:
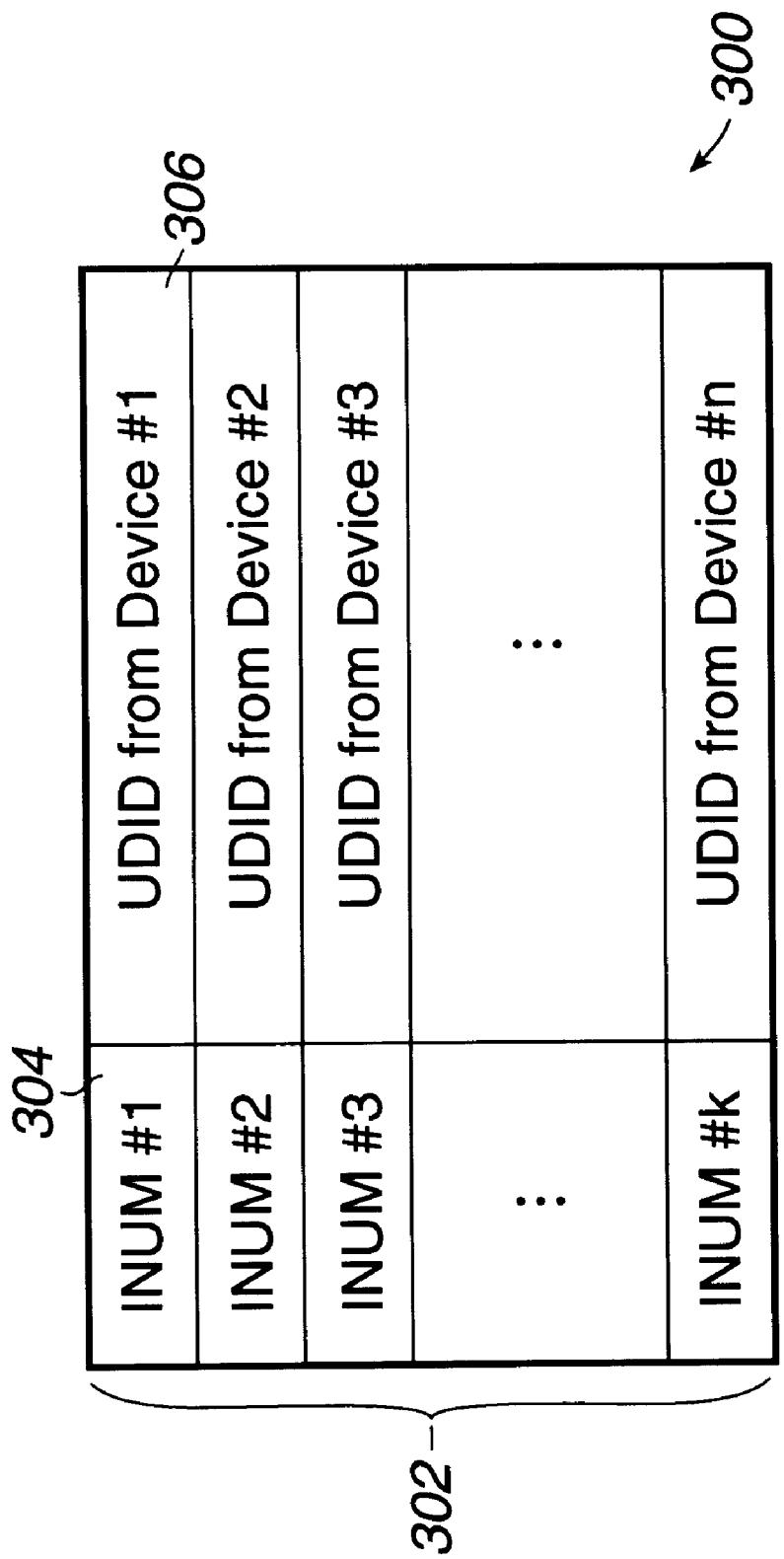
FIG. 3 schematically illustrates an interrupt table according to an embodiment of the present invention.

An exemplary interrupt table is illustrated in FIG. 3. Table 300 includes a plurality, k, of entries 302 corresponding to a plurality of peripheral interrupt sources. An interrupt number (INUM) is contained in field 304 and the corresponding UDID mapped to the INUM is included in field 306.

In an embodiment of the present invention, peripheral devices may be devices in accordance with the Peripheral Component Interconnect (PCI) protocol. In such an embodiment, the device ID may be a PCI configuration space address (CSA). Thus, for example, in an embodiment in which disk storage device 120 is a SCSI disk, I/O adapter 118 may include a PCI SCSI bus controller. Similarly, communications adapter 134 may include PCI peripheral devices for coupling system bus 112 (a portion of which may be a PCI bus) to network 142, which PCI device might be, for example, a Token ring controller or an Ethernet controller, depending on the particular architecture of network 142. Thus, it would be understood by one of ordinary skill in the art that data processing system 100 in accordance with an embodiment of a present invention may include a plurality of PCI devices. In such an embodiment, the PCI CSA may serve to uniquely identify a corresponding physical PCI peripheral device.

Alternatively, in an embodiment of the present invention, including non-PCI peripherals, a predetermined set of identifiers is provided. Each identifier in the predetermined set is associated with a corresponding physical device. In step 206, the boot firmware uses this association to generate the hardware map tables mapping interrupt numbers to physical devices.

The boot firmware then loads runtime firmware (RTF), step 208. The RTF includes routines for servicing hardware devices, and, in particular, servicing interrupts generated by the peripheral devices. The boot firmware initiates OS boot. The OS provides space for the RTF to be loaded in OS space in a portion of RAM 114 and calls the boot firmware to copy the RTF segments loaded in step 202 into the space provided by the OS. The RTF environment is initialized, in step 208, by the boot firmware which passes the arguments required by the RTF. When the RTF environment is initialized by the boot firmware, the boot firmware passes the interrupt map tables generated in step 206 to the RTF.

In step 210, the RTF builds peripheral device data structures. The RTF is device aware, having information related to each peripheral device attached to the data processing system, such as data processing system 100 in FIG. 1. The RTF builds a data structure corresponding to each peripheral device in the data processing system. Included in the data structure for each device is the corresponding device UDID, which the RTF may read from preselected devices. Additionally, the UDID may be coded into the RTF for other preselected devices. In this way, the RTF associates the unique UDID with the associated physical device.

Also associated with each peripheral device may be one or more memory spaces (which may also be referred to as register spaces) for containing control information and data related to the device. For example, in an embodiment of the present invention in which the peripheral devices may be PCI devices, each peripheral device may have a corresponding input/output (I/O) address space, and a corresponding memory address space. In such an embodiment, reads from and writes to the peripheral device are implemented as reads from, and writes to, respectively, the corresponding I/O address space. The I/O address space may also be used by the operating system to communicate control signals between the corresponding peripheral device and the operating system. The memory address space associated with a particular peripheral device may be used to hold data to be communicated to the device.

Figure 4:
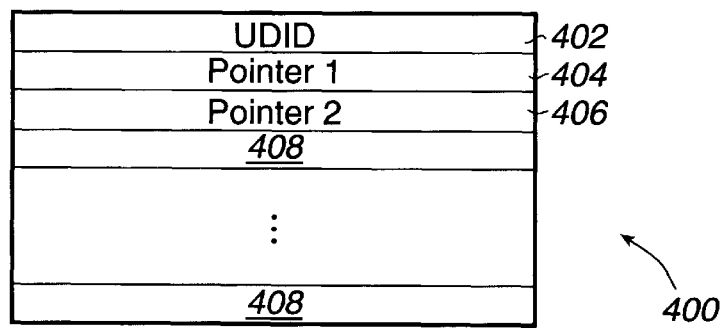
FIG. 4 schematically illustrates a data structure in accordance with an embodiment of the present invention.

This may be understood by referring to FIG. 4 illustrating a data structure 400 in accordance with one embodiment of the present invention. Data structure 400 includes a plurality of entries, in which entry 402 may include the UDID corresponding to the peripheral device associated with data structure 400. Additionally, data structure 400 may include first and second pointers, fields 404 and 406, respectively, pointing to corresponding memory spaces associated with the peripheral device. Additional registers 408 may be included in data structure 400 to contain additional information associated with the corresponding peripheral device. Such additional data may include, for example, a category of peripheral device to which the corresponding device belongs.

Figure 5:
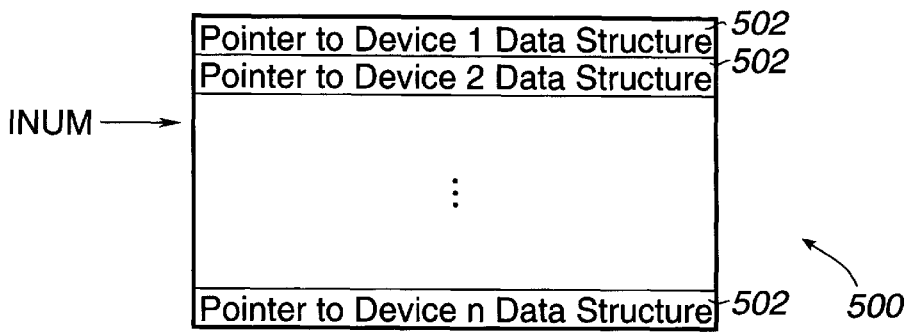
FIG. 5 schematically illustrates an interrupt vector table according to an embodiment of the present invention.

In step 211, the RTF builds an interrupt vector table (IVT) which maps interrupt numbers to the data structures built in step 210. An exemplary IVT 500 is illustrated in FIG. 5. IVT 500 includes a plurality of entries 502. Each entry contains an address (pointer) to one of the data structures built in step 210. The RTF uses the INUM to index into IVT 500. The data structure addresses in entries 502 are associated with the corresponding INUM by the RTF via the interrupt map passed to the RTF in step 208. IVT 500 remains in the RTF portion of RAM 114 for the life of the boot. IVT 500 allows the RTF to vector directly to a device data structure based on the device's INUM, provided by the OS when an interrupt occurs. This will be described further below.

Figure 6:
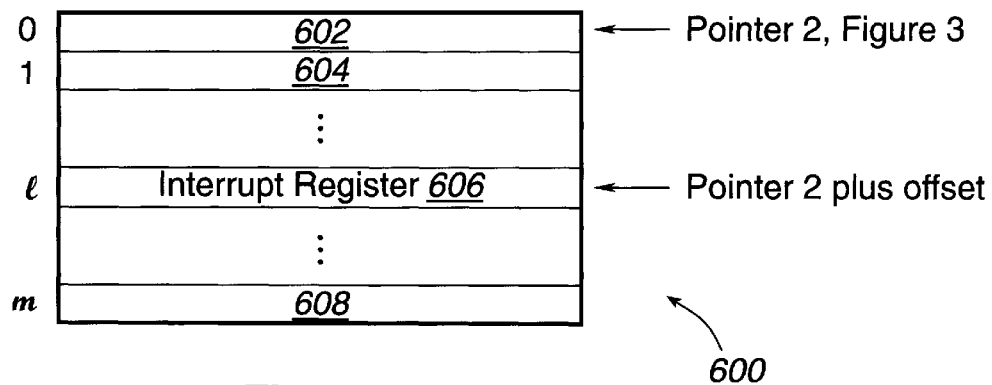
FIG. 6 schematically illustrates a memory space associated with an interrupt source in accordance with an embodiment of the present invention.

As previously described, one or more memory spaces may be associated with each peripheral device to receive data and control information for that device. This may be further understood by referring now to FIG. 6 illustrating a memory (register) space 600 in accordance with an embodiment of the present invention. Memory space 600 includes a plurality, m+1, of memory locations, 602, 604, 606, through 608. A first memory location, 602, is pointed to by one of pointer 1 and pointer 2 contained in registers 404 and 406, respectively, of data structure 300, FIG. 3. Memory space 600 is illustrated as being pointed to by pointer 2. However, it would be understood by an artisan of ordinary skill that, alternatively, memory space 600 may be pointed to by pointer 1 in data structure 400.

Memory location 606, at a preselected offset, l, constitutes an interrupt register. The RTF may use the preselected offset to vector directly to interrupt register 606. In an embodiment of the present invention, the RTF handles the peripheral device interrupts, and in such an embodiment interrupt register 606 contains information pertaining to the interrupt. This information may, for example, indicate the type of fault that generated the interrupt. Exemplary faults may include overvoltage and undervoltage conditions, or an overtemperature condition. It would be understood by one of ordinary skill in the art that these conditions are illustrative only, and other hardware fault conditions are within the spirit and scope of the present invention.

Returning again to FIG. 2, interrupt source isolation using the map tables generated in step 206 and the data structures built in step 210 may be further understood. Method 200 loops, in step 212, until an interrupt is received. An interrupt is initiated when the interrupting device drives (that is, asserts) a physical interrupt over an interrupt line corresponding to one of the INUMs. If an interrupt is received by the CPU, in step 214, the OS determines the INUM and passes the INUM to the RTF. In step 216, using the IVT, the RTF vectors to the interrupting device's data structure, which data structure may, for example, correspond to the data structure 400 illustrated in FIG. 4.

In step 218, the register space address in the interrupting device's data structure is accessed by the RTF. The RTF uses the address to vector to the interrupting devices interrupt register, in step 220, and in step 222 the RTF retrieves the interrupt information contained in the interrupt register and handles the interrupt. The RTF may, for example, generate an interrupt log and reset the interrupt. It would be understood by an artisan of ordinary skill that particular embodiments of the interrupt handling procedures are device and system configuration specific, and, the aforementioned examples are illustrative only. Other interrupt handling procedures are within the spirit and scope of the present invention, which does not depend on particular interrupt handling procedures for its implementation. After handling the interrupt, the RTF returns to the OS.

The present invention allows the operating system to go directly to the interrupting device in order to service the device's interrupt. During the boot process, the boot firmware binds each physical interrupt to a unique identifier which is then provided to runtime firmware which uses the mapping to associate an interrupt with the interrupting device as represented within the RTF by a corresponding data structure. Access to the interrupt register for the interrupting device is obtained by accessing the memory space associated with the interrupting device via an interrupt vector table generated by the RTF, whereby the RTF can directly vector to the memory space.

Although the present invention and its advantages have been described in detail, it should be understood that various changes, substitutions and alterations can be made herein without departing from the spirit and scope of the invention as defined by the appended claims.

What is claimed is:

1. A method of dynamic resource mapping for isolating interrupt sources comprising the steps of:

providing a plurality of interrupt source device identifiers, wherein each identifier corresponds to one of a plurality of interrupt sources;

generating a first table mapping said interrupt source identifiers to corresponding interrupt numbers; and associating an interrupt, represented by one of said interrupt numbers, with a corresponding device generating said interrupt using said first table.

2. The method of claim 1 wherein said step of associating said interrupt with a device generating said interrupt further comprises the step of accessing an interrupt register of said corresponding device in response to said associating step.

3. The method of claim 2 further comprising the step of building a plurality of data structures wherein each data structure corresponds to one of said plurality of interrupt sources, and wherein each data structure includes the device identifier of the corresponding interrupt source, each data structure including a first data value operable for accessing said interrupt register.

4. The method of claim 3 wherein said first data value operable for accessing an interrupt register comprises a first data value operable for accessing a memory space associated with the corresponding interrupt source, said memory space including said interrupt register.

5. The method of claim 4 further comprising the step of accessing an interrupt service routine, said step comprising the steps of:
 accessing said memory space;
 retrieving a second data value; and
 accessing said interrupt service routine in response to said second data value.

6. The method of claim 4 wherein said first data value comprises a pointer to said memory space.

7. The method of claim 3 wherein each said first data value is stored in a register having a predetermined offset from a start of each corresponding data structure.

8. The method of claim 4 wherein said interrupt register has a predetermined offset from a start of said memory space.

9. The method of claim 1 wherein said step of associating an interrupt comprises the steps of:
 generating a second table using said first table, wherein said second table comprises a plurality of entries, each being operable for receiving a pointer to a memory space associated with a corresponding interrupt source device;
 accessing said second table in response to said interrupt; and
 accessing said memory space using a corresponding one of said pointers.

10. The method of claim 9 wherein said step of accessing said second table comprises the step of indexing into said second table using an interrupt number received in response to said interrupt, and wherein said step of accessing said memory space further comprises the step of retrieving said pointer to said memory space from an entry selected in said indexing step, said accessing step using said retrieved pointer to access said memory space.

11. A data processing system comprising:
 a central processing unit (CPU); and
 a plurality of peripheral devices coupled to said CPU, wherein said CPU includes circuitry operable for dynamic resource mapping for isolating interrupts from said plurality of peripheral devices, said circuitry comprising:
  circuitry operable for providing a plurality of interrupt source device identifiers, wherein each identifier corresponds to one of said plurality of peripheral devices;
  circuitry operable for generating a first table mapping said interrupt source identifiers to corresponding interrupt numbers; and
  circuitry operable for associating an interrupt, represented by one of said interrupt numbers, with a corresponding device generating said interrupt using said first table.

12. The data processing system of claim 11 wherein said circuitry operable for associating said interrupt with a device generating said interrupt further comprises circuitry operable for accessing an interrupt register of said corresponding device in response to said circuitry operable for associating an interrupt.

13. The data processing system of claim 12 further comprising circuitry for building a plurality of data structures wherein each data structure corresponds to one of said plurality of peripheral devices, and wherein each data structure includes the device identifier of the corresponding peripheral device, each data structure including a first data value operable for accessing said interrupt register.

14. The data processing system of claim 13 wherein said first data value operable for accessing an interrupt register comprises a first data value operable for accessing a memory space associated with the corresponding peripheral device, said memory space including said interrupt register.

15. The data processing system of claim 14 further including circuitry operable for accessing an interrupt service routine, the circuitry comprising:
 circuitry operable for accessing said memory space;
 circuitry operable for retrieving a second data value; and
 circuitry operable for accessing said interrupt service routine in response to said second data value.

16. The data processing system of claim 14 wherein said first data value comprises a pointer to said memory space.

17. The data processing system of claim 14 wherein said second data value is stored in a register having a predetermined offset from a start of said memory space.

18. The data processing system of claim 13 wherein each said first data value is stored in a register having a predetermined offset from a start of each corresponding data structure.

19. The data processing system of claim 12 wherein said circuitry operable for associating an interrupt comprises:
 circuitry operable for generating a second table using said first table, wherein said second table comprises a plurality of entries, each being operable for receiving a pointer to a memory space associated with a corresponding interrupt source device;
 circuitry operable for accessing said second table in response to said interrupt; and
 circuitry operable for accessing said memory space using a corresponding one of said pointers.

20. The data processing system of claim 19 wherein said circuitry operable for accessing said second table comprises circuitry operable for indexing into said second table using an interrupt number received in response to said interrupt, and wherein said step of accessing said memory space further comprises the step of retrieving said pointer to said memory space from an entry selected in said indexing step, said accessing step using said retrieved pointer to access said memory space.

21. A program product in a computer readable medium for dynamic resource mapping for isolating interrupt sources, said program product comprising:
 programming for providing a plurality of interrupt source device identifiers, wherein each identifier corresponds to one of a plurality of interrupt sources;
 programming for generating a first table mapping said interrupt source identifiers to corresponding interrupt numbers; and
 programming for associating an interrupt, represented by one of said interrupt numbers, with a corresponding device generating said interrupt using said first table.

22. The program product of claim 21 wherein said programming for associating said interrupt with a device generating said interrupt further comprises programming for accessing an interrupt register in response to said programming for associating an interrupt with a corresponding device.

23. The program product of claim 22 further comprising programming for building a plurality of data structures wherein each data structure corresponds to one of said plurality of interrupt sources, and wherein each data structure includes the device identifier of the corresponding interrupt source, each data structure including a first data value operable for accessing said interrupt register.

24. The program product of claim 23 wherein said first data value operable for accessing an interrupt register comprises a first data value operable for accessing a memory space associated with the corresponding interrupt source, said memory space including said interrupt register.

25. The program product of claim 24 further including programing for accessing an interrupt service routine, the programming comprising:

programming for accessing said memory space;

programming for retrieving a second data value; and programming for accessing said interrupt service routine in response to said second data value.

26. The program product of claim 24 wherein said first data value comprises a pointer to said memory space.

27. The program product of claim 24 wherein each said first data value is stored in a register having a predetermined offset from a start of each corresponding data structure.

28. The program product of claim 24 wherein said second data value is stored in a register having a predetermined offset from a start of said memory space.

29. The program product of claim 21 wherein said programming for associating an interrupt comprises:

programming for generating a second table using said first table, wherein said second table comprises a plurality of entries, each being operable for receiving a pointer to a memory space associated with a corresponding interrupt source device;

programming for accessing said second table in response to said interrupt; and programming for accessing said memory space using a corresponding one of said pointers.

30. The program product of claim 29 wherein said programming for accessing said second table comprises programming for indexing into said second table using an interrupt number received in response to said interrupt, and wherein said programming for accessing said memory space further comprises programming for retrieving said pointer to said memory space from an entry selected in response to said programming for indexing, said programming for accessing using said retrieved pointer to access said memory space.

\* \* \* \* \*